(12) United States Patent
Patil et al.

(10) Patent No.: US 8,819,380 B2
(45) Date of Patent: Aug. 26, 2014

(54) CONSIDERATION OF ADJACENT TRACK INTERFERENCE AND WIDE AREA ADJACENT TRACK ERASURE DURING BLOCK ALLOCATION

(75) Inventors: Sandeep R. Patil, Pune (IN); Sriram Ramanathan, Lutz, FL (US); Riyazahamad M. Shiraguppi, Pune (IN); Matthew B. Trevathan, Kennesaw, GA (US)

(73) Assignee: International Business Machines Corporation, Armonk, NY (US)

( * ) Notice: Subject to any disclaimer, the term of this patent is extended or adjusted under 35 U.S.C. 154(b) by 199 days.

(21) Appl. No.: 13/425,899

(22) Filed: Mar. 21, 2012

(65) Prior Publication Data

US 2013/0254508 A1  Sep. 26, 2013

(51) Int. Cl.
*G06F 12/00* (2006.01)

(52) U.S. Cl.
USPC ........... 711/170; 711/165; 711/171; 711/172; 711/173

(58) Field of Classification Search
USPC ......................................... 711/165, 170–173
See application file for complete search history.

(56) References Cited

U.S. PATENT DOCUMENTS

| | | | |
|---|---|---|---|
| 7,447,836 B2 | 11/2008 | Zhang et al. |
| 7,522,366 B2 | 4/2009 | Mettler et al. |
| 7,567,397 B2 | 7/2009 | Lu |
| 7,747,907 B2 | 6/2010 | Olds et al. |
| 7,996,636 B1 | 8/2011 | Prakash et al. |
| 8,014,097 B1 | 9/2011 | Sanvido |
| 2007/0208904 A1* | 9/2007 | Hsieh et al. ................... 711/103 |
| 2008/0077762 A1 | 3/2008 | Scott et al. |
| 2008/0287802 A1 | 11/2008 | Li et al. |
| 2009/0049238 A1 | 2/2009 | Zhang et al. |
| 2009/0135693 A1 | 5/2009 | Kim et al. |
| 2009/0244775 A1 | 10/2009 | Ehrlich |
| 2010/0180093 A1 | 7/2010 | Huber et al. |
| 2010/0268866 A1 | 10/2010 | Colligan |

(Continued)

FOREIGN PATENT DOCUMENTS

WO 9746953 A1 11/1997

OTHER PUBLICATIONS

Patil et al. "Consideration of Adjacent Track Interference and Wide Area Adjacent Track Erasure During Disk Defragmentation". U.S. Appl. No. 13/426,138, filed Mar. 21, 2012.

(Continued)

*Primary Examiner* — Jasmine Song
(74) *Attorney, Agent, or Firm* — Jason H. Sosa; Noah Sharkan

(57) ABSTRACT

Embodiments of the present invention provide a system, method, and program product for allocating a block of physical storage space on a write surface of a hard disk drive. A computer system maintains a write count for each block on the hard disk drive. After receiving an allocation request, the computer system identifies one or more candidate blocks of storage space on the hard disk drive that can be selected to fulfill the allocation request. The computer system determines an estimated write count and identifies one or more allocated blocks whose write counts are within a specified number of write operations of the estimated write count. The computer system selects a candidate block based, at least in part, on physical proximity of the candidate block to one or more of the allocated blocks whose write counts are within a specified number of write operations of the estimated write count.

21 Claims, 8 Drawing Sheets

(56) References Cited

U.S. PATENT DOCUMENTS

| | | |
|---|---|---|
| 2011/0026159 A1 | 2/2011 | Tsai et al. |
| 2011/0075290 A1 | 3/2011 | Hobbet |
| 2011/0181978 A1 | 7/2011 | Rub |

OTHER PUBLICATIONS

"Disk Defragmenter (Windows)—Wikipedia, the free encyclopedia". [online] [retrieved on: Jan. 13, 2012]. Retrieved from the internet: <URL:http:en.wikipedia.org/w/index.php?title=disk_Defragmenter_(Windows)&oldid=435960617>.

Guha, A. "Disk Failure Rates and Implications of Enhanced MAID Storage Systems". Copan Systems. Apr. 27, 2006. Longmont, CO.

Scholz, Sebastian. "The Write Anywhere File Layout System (WAFL)", based on "File System Design for an NFS File Server Appliance" by Dave Hitz, James Lau and Michael Malcolm, Network Appliance, Inc. [online] [retrieved in Jun. 2011]. Retrieved from the internet: <URL:http://comet.lehman.cuny.edu/jung/cmp426697/WAFL.pdf>.

Tang, Yuhui, et al. "Understanding Adjacent Track Erasure in Discrete Track Media". To Appear in the IEEE Transaction on Magnetics, Sep. 2008. Department of Electrical and Computer Engineering, Carnegie Mellon University, Pittsburgh, PA. USA. Samsung Information Systems America, San Jose, CA. USA.

\* cited by examiner

CONSIDERATION OF ADJACENT TRACK INTERFERENCE AND WIDE AREA ADJACENT TRACK ERASURE DURING BLOCK ALLOCATION

TECHNICAL FIELD

The present invention relates generally to hard disk drives and, more particularly, to allocating blocks of storage space on hard disk drives.

BACKGROUND

At present, hard disk drives are one of the most common forms of electronic data storage devices. Hard disk drives typically contain multiple magnetic disks ("platters") which serve as the storage media. The platters are rotated and magnetic heads write data as a series of magnetic polarity transitions in a plurality of concentric circular tracks on the surfaces of the platters. For example, a track region of uniform magnetic polarity can represent a "0" and a track region containing a transition from one magnetic polarity to the opposite magnetic polarity can represent a "1", where each "0" or "1" constitutes a bit. The magnetic heads can also read stored data by moving into position over particular tracks and detecting these magnetic polarity transitions (or the absence thereof) as the platters rotate beneath.

Each platter is divided into geometrical sectors. The intersections of geometrical sectors and the concentric circular tracks define data sectors. Each data sector typically consists of 512 bytes, and each byte typically consists of 8 bits. A block, which typically represents the smallest storage unit that can be allocated for storing data, consists of a contiguous group of data sectors. For example, a 4 kilobyte block typically consists of 8 contiguous data sectors (i.e., 512 byte sectors).

An ever-present concern in hard disk drive technology is adjacent track interference (ATI) and wide area adjacent track erasure (ATE). ATI occurs when a head successively writes data on a particular track of a platter and the magnetic field of the head weakens the magnetic polarity transitions on adjacent tracks, potentially to the extent that the data on the adjacent tracks becomes unreadable. ATE is a similar effect that has the potential to corrupt data on a larger number of adjacent tracks. For example, if data stored on track N is frequently modified (e.g., the head is frequently performing writes to that track region), data located on adjacent tracks N+1 and N−1 that is near the high-write region of track N can be subject to ATI and ATE. As the disparity in write frequencies of data on adjacent tracks becomes greater, the potential for ATI and ATE typically increases. For example, infrequently written data that is adjacent to a track region with a high write frequency is especially susceptible to ATI and ATE.

A file system enables applications to store and access data on a hard disk drive. To store a file on a hard disk drive using a typical file system, the file system must initially allocate a whole number of free blocks for the file to use. Based on the anticipated size of a file to be stored, an application can issue allocation requests to the file system for the appropriate number of free blocks. Later, if the size of the file increases, the file system can allocate additional free blocks; if the file size is reduced or the file is deleted, the file system can free the file's allocated blocks for allocation to other files. It should be noted that, while each individual block consists of contiguous sectors, a group of free blocks allocated for a particular file need not be contiguous. For example, if a contiguous group of free blocks equal to the requested amount is not available, a single file can be allocated to a group of free blocks that are non-contiguously distributed (i.e., fragmented) over the tracks of a platter or multiple platters within the stack of a hard disk drive.

A file system's allocation method determines which particular free blocks to allocate for a file. A common allocation method involves giving preference to allocating a contiguous group of free blocks on one of the outermost tracks of a platter. This method can ultimately enable faster access to the file. For example, if all blocks allocated for the file are contiguous on a single track, the entire file can be accessed on a single platter rotation (i.e., reduced rotational latency) and without having to move the heads to multiple tracks (i.e., reduced seek time). Further, this method takes advantage of the higher media transfer rates of outer tracks (i.e., with zone bit recording and constant rotational velocity of platters, the greater linear velocity and quantity of blocks on outer tracks enables more of those blocks to be accessed by a head per unit of time relative to blocks on inner tracks). However, as a consequence of giving preference to free blocks located on outer tracks, these regions will often experience a high number of writes, while inner tracks adjacent to these high-write regions will often experience a lesser number of writes. Accordingly, this method can result in a distribution of allocated blocks that is ripe for ATI and ATE effects.

One technique to minimize the potential for ATI and ATE involves reducing the number of tracks per inch (TPI) on the platters. By decreasing the TPI, tracks are spaced farther apart, which can help reduce the extent to which the heads' magnetic fields affect the data stored on adjacent tracks. However, decreasing the TPI typically reduces the storage capacity of a platter. Further, decreasing TPI can result in poorer performance due to increased seek times.

Other techniques to minimize the potential for ATI and ATE involve periodically performing refresh cycles. In a typical refresh cycle, the data on a track that is potentially subject to ATI and ATE is read and then rewritten in the same location. Rewriting the data helps ensure its continued integrity by strengthening the magnetic polarity transitions that may have been weakened by ATI and ATE. The tracks on which to perform refresh cycles can be determined by monitoring the number of write operations on each track and, upon reaching a threshold number of write operations for a given track, performing a refresh cycle on the tracks adjacent to that track. However, performing refresh cycles can negatively impact performance on account of increased seek times and because certain read and write functions cannot be performed during refresh cycles. Further, performing refresh cycles can involve additional head movement, additional platter rotations, and other hard disk drive processes that may increase power consumption.

SUMMARY

Embodiments of the present invention provide a system, method, and program product for allocating a block of physical storage space on a write surface of a hard disk drive. A computer system maintains a write count for each block on the hard disk drive, wherein a write count is a cumulative number of write operations performed on a block of storage space. The computer system receives an allocation request for a block of storage space on the hard disk drive. The computer system identifies one or more candidate blocks of storage space on the hard disk drive that can be selected to fulfill the allocation request. The computer system determines an estimated write count, wherein the estimated write count is an estimated number of write operations that will be performed on any candidate block that is subsequently selected from the one or more candidate blocks to fulfill the allocation request. The computer system identifies one or more allocated blocks of storage space on the hard disk drive whose write counts are within a specified number of write operations of the estimated write count. The computer system selects a candidate block from the one or more candidate blocks based, at least in part, on physical proximity of the candidate block to one or more of the one or more allocated blocks of storage space on the hard disk drive whose write counts are within a specified number of write operations of the estimated write count. The computer system allocates the selected candidate block to fulfill the allocation request.

In certain embodiments of the present invention, the computer system selects a candidate block from the one or more candidate blocks that is located on a track that is adjacent to one or more tracks on which the one or more allocated blocks of storage space whose write counts are within a specified number of write operations of the estimated write count are located.

DETAILED DESCRIPTION

Embodiments of the present invention will now be described in detail with reference to the accompanying drawings.

Figure 1:
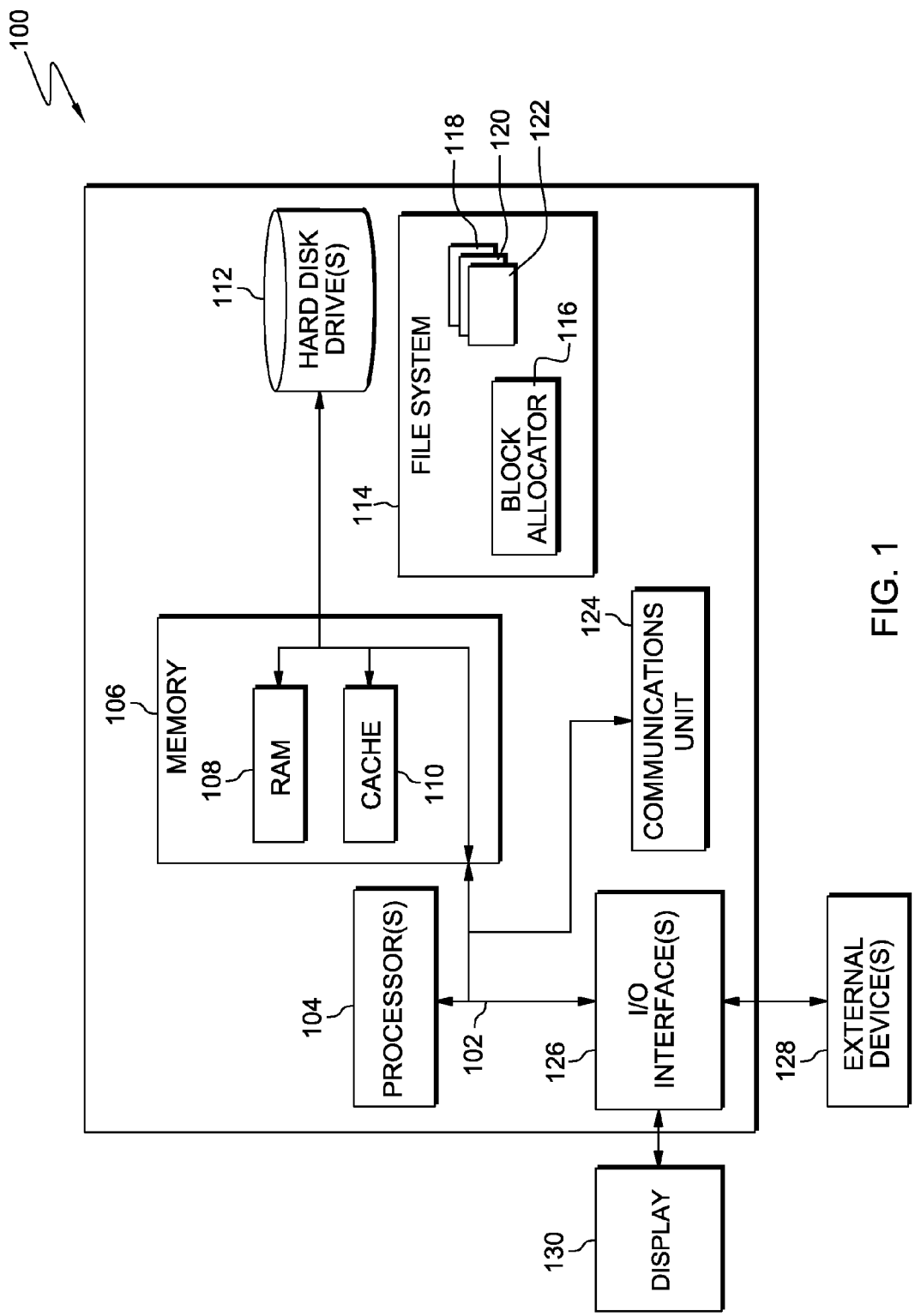
FIG. 1 is a block diagram of a computer system in accordance with an embodiment of the present invention.

FIG. 1 is a functional block diagram of a computer system 100 in accordance with an embodiment of the present invention. Computer system 100 is representative of any electronic device or combination of electronic devices capable of executing machine-readable program instructions. Examples of computer systems, environments, and/or configurations that may be represented by computer system 100 include, but are not limited to, desktop computers, laptop computers, server computers, thin clients, thick clients, multiprocessor systems, microprocessor-based systems, and distributed cloud computing environments that include any of the above systems or devices. In certain embodiments, computer system 100 represents a computer system utilizing clustered computers and components to act as a single pool of seamless resources when accessed through a network. For example, such embodiments may be used in datacenter, cloud computing, storage area network (SAN), and network attached storage (NAS) applications.

Computer system 100 includes one or more buses 102, which provide for communications between one or more processors 104, memory 106, one or more hard disk drives 112, communications unit 124, and one or more input/output (IO) interfaces 126.

Memory 106 and hard disk drives 112 are examples of computer-readable tangible storage devices. Computer-readable tangible storage devices are hardware capable of storing information such as data, program code in functional form, and/or other suitable information on a temporary basis and/or permanent basis. A computer-readable tangible storage device, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Memory 106 can include one or more random access memories (RAM) 108, cache memory 110, or any other suitable volatile or non-volatile storage device.

Hard disk drives 112 may be, for example, one or more Advanced Technology Attachment (ATA), Serial ATA (SATA), Small Computer System Interface (SCSI), or Serial Attached SCSI (SAS) compatible hard disk drives. In a preferred embodiment, hard disk drives 112 use zone bit recording and have an integrated RAM and/or cache memory. In general, hard disk drives 112 may be any computer-readable tangible storage devices that utilize rotatable magnetic storage media. Hard disk drives 112 may be implemented as a single hard disk drive or a plurality of hard disk drives in different configurations, such as, for example, as independent hard disk drives or as a plurality of hard disk drives in a redundant array of independent disks (RAID). Hereinafter, for purposes of explanation, embodiments of the present invention will be discussed with regard to a single hard disk drive 112.

Software and data, including one or more operating systems, file system 114, block allocator 116, and tables 118 through 122, are stored on hard disk drive 112 for access and/or execution by one or more of the respective processors 104 via one or more memories of memory 106.

File system 114 enables applications to store, access, and delete data on hard disk drive 112 in accordance with embodiments of the present invention. Generally, the functionalities of file system 114 can be divided into high and low levels. At the high level, file system 114 enables applications to access logical records of data stored on hard disk drive 112. For example, file system 114 can maintain and provide to applications a logical presentation of data as files and directories. At the low level, file system 114 manages data as blocks on the surfaces of the platters of hard disk drive 112. For example, file system 114 can manage all free and allocated blocks on hard disk drive 112. File system 114 can also interface with a hard disk device driver, which can communicate with a controller within hard disk drive 112 to perform read and write functions on the surfaces of the platters. In a preferred embodiment, file system 114 is implemented using an existing file system architecture, such as, for example, a GPFS™ or NTFS file system architecture.

File system 114 includes block allocator 116, write group table 118, block information table 120, and track usage table 122. Block allocator 116 is a module responsible for allocating blocks to fulfill each allocation request that is issued to file system 114 in accordance with embodiments of the present invention. Block allocator 116 utilizes information contained in tables 118 through 120, as discussed in greater detail with regard to FIGS. 4 and 5. In a preferred embodiment, block allocator 116 is implemented as a modified version of an existing file system's block allocator. In other embodiments, block allocator 116 can be implemented as a separate submodule that intercepts allocation requests issued to file system 114, selects a block to allocate, and returns the selected block to the file system's block allocator for allocation.

It should be appreciated that file system 114 can contain other modules (not shown) that handle other types of requests and file system processes such as, for example, read, write, and delete requests and their respective file system processes.

Tables 118 through 122 are created during file system creation and are maintained by file system 114. Write group table 118 defines multiple write groups based on their write counts, as discussed in greater detail with regard to FIG. 2A. Block information table 120 contains information pertaining to each block on hard disk drive 112, as discussed in greater detail with regard to FIG. 2B. Track usage table 122 contains information pertaining to each track on hard disk drive 112, as discussed in greater detail with regard to FIG. 2C. It should be appreciated that, depending on design choice and the architecture of file system 114, file system 114 can include additional tables or fewer tables. For example, NTFS file system architectures typically utilize a master file table (MFT). In certain embodiments of the present invention, the information contained in tables 118 through 122 can be incorporated into such other tables.

Communications unit 124 provides for communications with other computer systems and/or devices via a network such as, for example, a local network, the Internet, or another wide area network. The network may comprise, for example, copper wires, optical fibers, wireless transmission, routers, firewalls, switches, gateway computers, and/or edge servers. Communications unit 124 may include network adapters or interfaces such as TCP/IP adapter cards, wireless Wi-Fi interface cards, 3G or 4G wireless interface cards, or interfaces for other wired or wireless communications links. Software and data used to practice embodiments of the present invention can be downloaded to computer system 100 from an external computer system via a network and communications unit 124 and can be loaded onto hard disk drive 112.

One or more I/O interfaces 126 allow for input and output of data with other devices that may be connected to computer system 100. For example, I/O interfaces 126 can provide a connection to one or more external devices 128 and display 130. External devices 128 can include a keyboard, computer mouse, touch screen, and other human interface devices. External devices 128 can also include portable computer-readable tangible storage devices such as, for example, thumb drives, optical or magnetic disks, and/or memory cards. Software and data used to practice embodiments of the present invention can be stored on such portable storage devices and can be loaded onto hard disk drive 112.

Display 130 provides a mechanism to display data to a user of computer system 100 and can be, for example, a computer monitor. Alternatively, display 130 can be an incorporated display that also functions as an input device, such as, for example, a display of a tablet computer that also functions as a touch screen.

Figure 2A:
FIGS. 2A through 2C show illustrations of the tables of FIG. 1 in accordance with an embodiment of the present invention.
Figure 2B:
Figure 2C:

Turning now to FIGS. 2A through 2C, tables 118 through 122 are shown in accordance with embodiments of the present invention. For illustrative purposes, these exemplary tables include fictitious values that reflect fictitious allocation activity that has occurred after file system creation. The values found in these tables are not necessarily intended to be representative of actual values that might be generated when practicing embodiments of the present invention.

FIG. 2A depicts a write group table 118 in accordance with an embodiment of the present invention. Write group table 118 defines groups of blocks ("write groups") based on threshold numbers of write counts. During file system creation, an administrative user of computer system 100 can specify the number of write groups to use based on his or her desired level of granularity. In a preferred embodiment, write group table 118 contains at least three write groups (as shown in FIG. 2A, for example). Each block on hard disk drive 112 exists in a write group. During different file system operations, such as block allocation, writing, and deletion, blocks can be moved from one write group to another, as discussed in greater detail later in this specification.

The "Group" column contains the name of each write group (e.g., LowWrite, MedWrite, and HighWrite). The "Minimum Write Threshold" and "Maximum Write Threshold" columns contain user-specified minimum and maximum write count thresholds that a particular block's write count must be within in order to be placed in a given write group. The "Number of Blocks" column indicates the total number of blocks within each write group. If, as a result of allocation activity or other file system processes, a write group no longer contains blocks, the write count thresholds of the group can be updated such that the group encompasses more blocks, as discussed in greater detail later in this specification.

FIG. 2B depicts a block information table 120 in accordance with an embodiment of the present invention. Block information table 120 contains entries for each block on hard disk drive 112. The "Block No." column identifies each block's logical block number (i.e., logical block address). The "Track" column identifies the track number of the track on which each block is located. The "Write Group" column identifies the write group in which each block currently resides. For each block, the "Next Block in Group" column identifies the block number of the next sequential block that is in the same write group and has the same allocation status. The "Write Count" column identifies each block's cumulative write count (i.e., the total number of write operations performed on that block). The "Allocation Status" column identifies each block's current allocation status (i.e., free or allocated).

Using block information table 120, file system 114 maintains two lists for each write group: a free block list and an allocated block list. As discussed in greater detail with regard to FIGS. 3 through 8, block allocator 116 and file system 114 manage the write groups in which each block resides by adjusting each groups' free block and allocated block lists during block allocation and other processes.

FIG. 2C depicts a track usage table 122 in accordance with an embodiment of the present invention. Track usage table 122 contains entries for each track on hard disk drive 112. The "Track No." column identifies the track number for each track, beginning with the outermost track. The "Total Number of Blocks" column identifies the total number of blocks on each track. The "Number of Allocated Blocks" column identifies the number of allocated blocks on each track. Block allocator 116 can utilize track usage table 122 to identify less utilized tracks.

Figure 3:
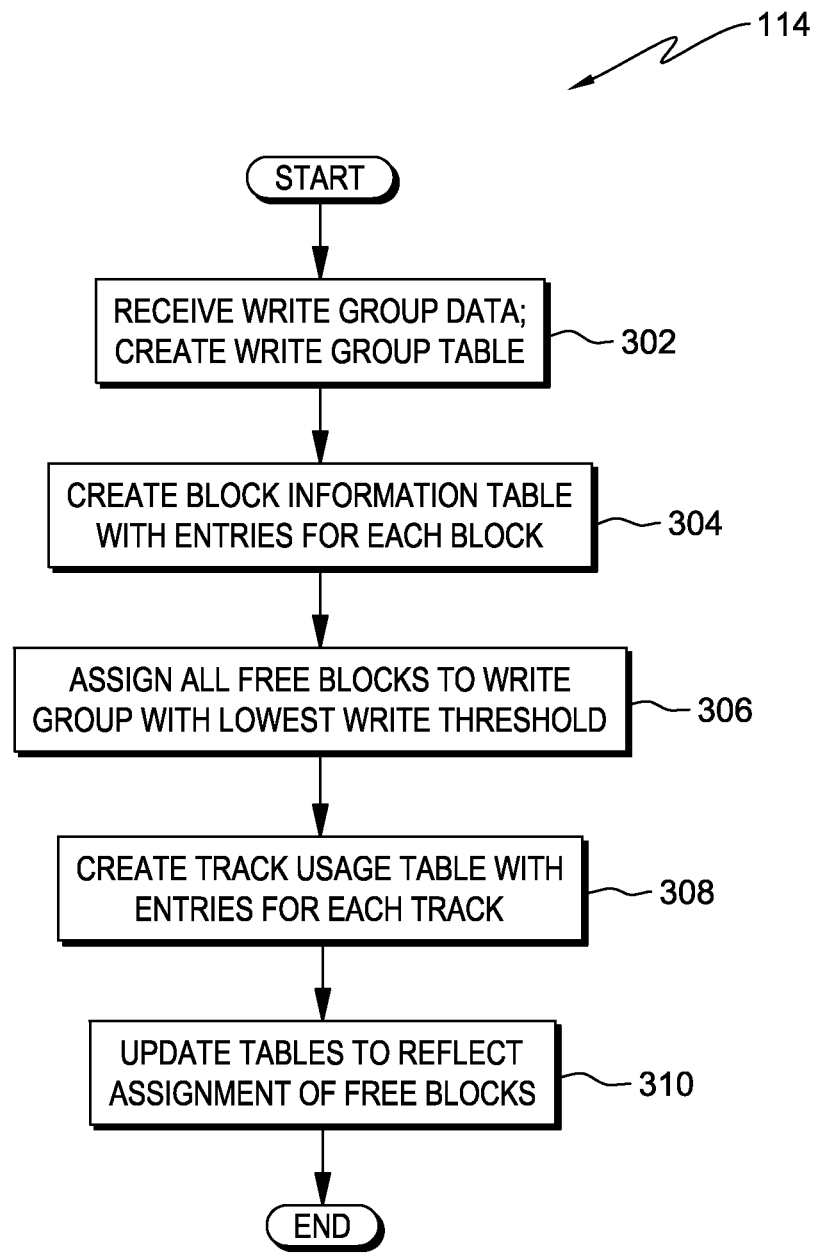
FIG. 3 is a flowchart illustrating operational steps for creating the tables of FIGS. 2A through 2C during file system creation in accordance with an embodiment of the present invention.

FIG. 3 is a flowchart illustrating operational steps for creating tables 118 through 122 during file system creation in accordance with an embodiment of the present invention. In step 302, file system 114 receives data inputted by an administrative user of computer system 100 representative of the specified number of write groups to create and the groups' respective minimum and maximum write thresholds. File system 114 then creates a write group table 118 in accordance with the specified data.

In step 304, file system 114 creates a block information table 120 with entries for each block on hard disk drive 112. In step 306, file system 114 assigns all free blocks to the write group with the lowest write threshold number. For example, with regard to the exemplary write group table 118 depicted in FIG. 2A, file system 114 would assign all free blocks to the LowWrite group.

In step 308, file system 114 creates a track usage table 122 with entries for each track on hard disk drive 112. In step 310, file system 114 updates all of the tables to reflect the assignment of all free blocks to the write group with the lowest write threshold number.

Figure 4:
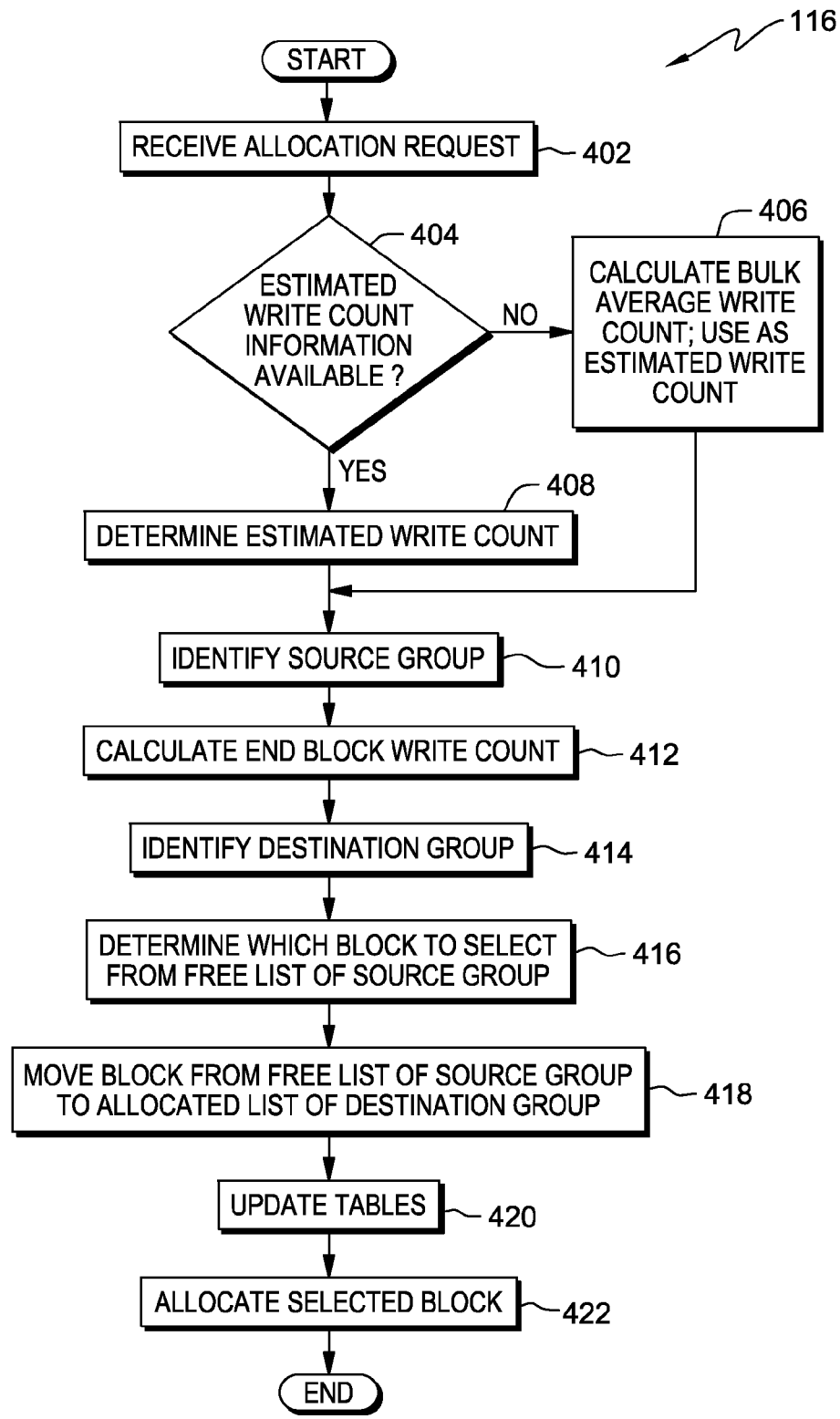
FIG. 4 is a flowchart illustrating operational steps for allocating a free block in accordance with an embodiment of the present invention.

FIG. 4 is a flowchart illustrating operational steps that block allocator 116 performs when allocating a free block in accordance with an embodiment of the present invention. In step 402, block allocator 116 receives an allocation request for a block ("requested block"). For example, block allocator 116 receives an allocation request issued by an application seeking to save a file. In a preferred embodiment, the requested block is not a specific block; the requested block represents any block that will ultimately be selected to fulfill the allocation request.

In step 404, block allocator 116 determines whether the allocation request includes information that can be used to estimate how many times the requested block will be written (i.e., the requested block's write count). For example, the following information can be indicative of how many times the requested block will be written and can potentially be used to estimate the requested block's write count: the file extension of the file for which the allocation request was made (e.g., JPEG image files are typically read-only, whereas LOG files typically involve frequent writes); the identity of the application issuing the allocation request (e.g., based on the application's input/output pattern over time); and any additional information provided by the application (e.g., a database application may indicate that the requested block will be used to store database metadata information, which typically involves frequent writes.).

If, in step 404, block allocator 116 determines that the allocation request does not include information that can be used to estimate the requested block's write count, then, in step 406, block allocator 116 calculates an average write count for all allocated blocks on hard disk drive 112, and uses this value as the estimated write count of the requested block. In a preferred embodiment, block allocator 116 calculates a bulk average write count according to the following equation:

$$\text{Bulk Average Write Count} = \frac{TotalWritesAllocated}{TotalAllocated} \quad \text{Equation 1}$$

where TotalWritesAllocated is the total number of write operations for all allocated blocks, as determined from block information table 120, and TotalAllocated is the total number of allocated blocks, also as determined from block information table 120.

If, in step 404, block allocator 116 determines that the allocation request includes information that can be used to estimate the requested block's write count, then, in step 408, block allocator 116 utilizes that information to determine the estimated write count of the requested block. For example, an administrative user can establish an average write count for allocation requests associated with all common file extensions, and in step 408, block allocator 116 can access these values to determine the estimated write count of a requested block associated with a particular file extension.

In step 410, block allocator 116 identifies a source group. The source group is the write group from which a free block will ultimately be selected to fulfill the allocation request. In a preferred embodiment, the source group is always the write group with the lowest write threshold and, in step 410, block allocator 116 accesses write group table 118 to identify the write group with the lowest write threshold. If, as a result of allocation activity or other file system processes, the write group with the lowest threshold no longer contains blocks, file system 114 can update the write count thresholds of the group to encompass more blocks. For example, the maximum write count threshold of the group can be increased, and the write count thresholds of the remaining groups can be adjusted upward accordingly.

In step 412, block allocator 116 calculates an end block write count. The end block write count represents an estimated total write count of the free block which will be selected to fulfill the allocation request in later steps. That is, the end block write count value accounts for writes that may have already been performed on the blocks within the source group. In a preferred embodiment, block allocator 116 calculates the end block write count according to the following equation:

$$\text{End Block Write Count} = \frac{MinThreshSrc + MaxThreshSrc}{2} + EstimatedWriteCount \quad \text{Equation 2}$$

where MinThreshSrc is the minimum write threshold of the source group, MaxThreshSrc is the maximum write threshold of the source group, and EstimatedWriteCount is the estimated write count of the requested block as determined in either step 406 or 408. Block allocator 116 obtains the minimum and maximum write thresholds from write group table 118.

In step 414, block allocator 116 identifies a destination group. The destination group is the write group in which the block selected to fulfill the allocation request will be placed, as discussed in later steps. The destination group can be the same write group as the source group. In a preferred embodiment, the destination group is the write group whose write thresholds contain the end block write count calculated in step 412. Block allocator 116 identifies the destination group by accessing write group table 118 to identify the write group whose minimum write threshold is less than or equal to the end block write count, and whose maximum write threshold is greater than the end block write count. In other embodiments, the destination group can be the write group whose write thresholds contain the estimated write count as determined in either step 406 or 408. In such embodiments, an end block write count need not be calculated.

In step 416, block allocator 116 determines which block to select from the free list of the source group to fulfill the allocation request (i.e., where, physically, on the hard disk drive the requested block will be located). In one embodiment, block allocator 116 selects a free block that is located near, and on a track adjacent to the track of, an allocated destination group block that has a similar write count to the end block write count. In another embodiment, block allocator 116 selects a free block that is located near, and on a track adjacent to the tracks of, both a recently allocated block and an allocated destination group block that has a similar write count to the end block write count. In another embodiment, such as the embodiment discussed later with regard to FIG. 5, block allocator 116 selects a free block that is located on a relatively outer track and is located near, and on a track adjacent to the tracks of, both a recently allocated block and an allocated destination group block that has a similar write count to the end block write count and resides on a less utilized track.

After selecting a block from the free list of the source group, in step 418, block allocator 116 removes the selected block from the free list of the source group and adds the selected block to the allocated list of the destination group.

In step 420, block allocator 116 instructs file system 114 to update write group table 118, block information table 120, and track usage table 122 accordingly. Block allocator 116 also instructs file system 114 to add the selected block to a recent block allocation list that is maintained by file system 114.

In step 422, block allocator 116 fulfills the allocation request by allocating the selected block, after which the application that issued the allocation request can utilize the selected block for data storage.

Accordingly, embodiments of the present invention enable allocation of blocks uniformly across tracks of the hard disk drive in a manner that can decrease the disparity between write frequencies of blocks on adjacent tracks, which can help decrease the potential for ATI and ATE.

Figure 5:
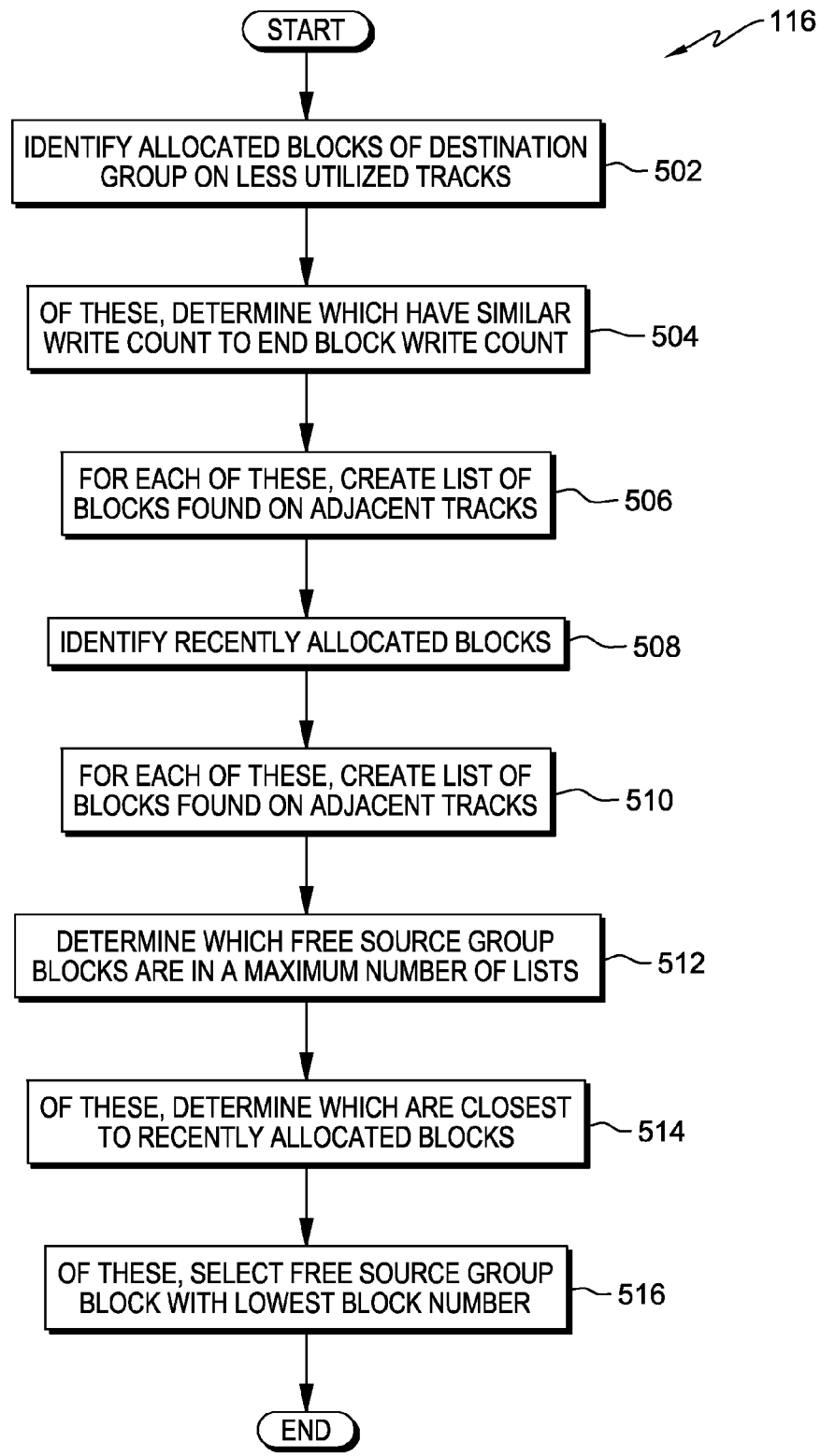
FIG. 5 is a flowchart illustrating operational steps for selecting a free block from a source group in accordance with an embodiment of the present invention.

FIG. 5 is a flowchart illustrating operational steps for determining which block to select from the free list of a source group to fulfill an allocation request in accordance with an embodiment of the present invention. For example, operational step 416 of FIG. 4 can involve performing the operational steps depicted in FIG. 5.

In step 502, block allocator 116 identifies allocated blocks in the destination group that reside on less utilized tracks. To identify the less utilized tracks, block allocator 116 accesses track usage table 122 to identify a specified number of tracks that have the lowest numbers of allocated blocks. For example, block allocator 116 identifies two tracks that have the lowest numbers of allocated blocks. Block allocator 116 then accesses block information table 120 to identify which of the allocated blocks in the destination group reside on those tracks.

In step 504, block allocator 116 identifies which of the allocated blocks identified in step 502 have a similar write count to the end block write count of the requested block as determined, for example, in step 412 of FIG. 4. In a preferred embodiment, block allocator 116 accesses block information table 120 to identify which blocks have a write count that is within a specified range of the end block write count. For example, the specified range can be +/−500 writes and, in step 504, block allocator 116 can identify which blocks have a write count that is within 500 writes of the end block write count.

In step 506, for each allocated block identified in step 504 (i.e., allocated blocks in the destination group that reside on a less utilized track and have a similar write count to the end block write count), block allocator 116 creates a list of blocks that reside on the allocated block's adjacent tracks. For example, each list, as described in this step, can be expressed as a range of blocks bounded by the first and last blocks on a particular track.

In step 508, block allocator 116 identifies a specified number of recently allocated blocks. In a preferred embodiment, block allocator 116 accesses a recent block allocation list that is maintained by file system 114. For example, the recent block allocation list can contain the block numbers of the blocks that were allocated to fulfill the last ten allocation requests.

In step 510, for each recently allocated block identified in step 508, block allocator 116 creates a list of blocks that reside on the recently allocated block's adjacent tracks. Again, each list, as described in this step, can be expressed as a range of blocks bounded by the first and last blocks on a particular track.

In step 512, block allocator 116 determines which blocks from the free list of the source group exist in a maximum number of the lists created in steps 506 and 510. Stated differently, block allocator 116 identifies the free blocks from the source group that are located on a track that is adjacent to the tracks on which the greatest number of the blocks identified in steps 504 and 508 are located.

In step 514, block allocator 116 determines which of the free blocks identified in step 512 are nearest to one or more of the recently allocated blocks identified in step 508. For example, block allocator 116 can identify the free blocks nearest to the recently allocated blocks on the basis of their respective block numbers.

In step 516, block allocator 116 selects from the free blocks identified in step 514 the free block having the lowest block number (i.e., located on a relatively outer track). After step 516, the selected block can be removed from the free list of the source group, added to the allocated list of the destination group, and allocated to fulfill the allocation request in accordance with embodiments of the present invention, such as, for example, in operational steps 418 through 422 of FIG. 4.

Figure 6:
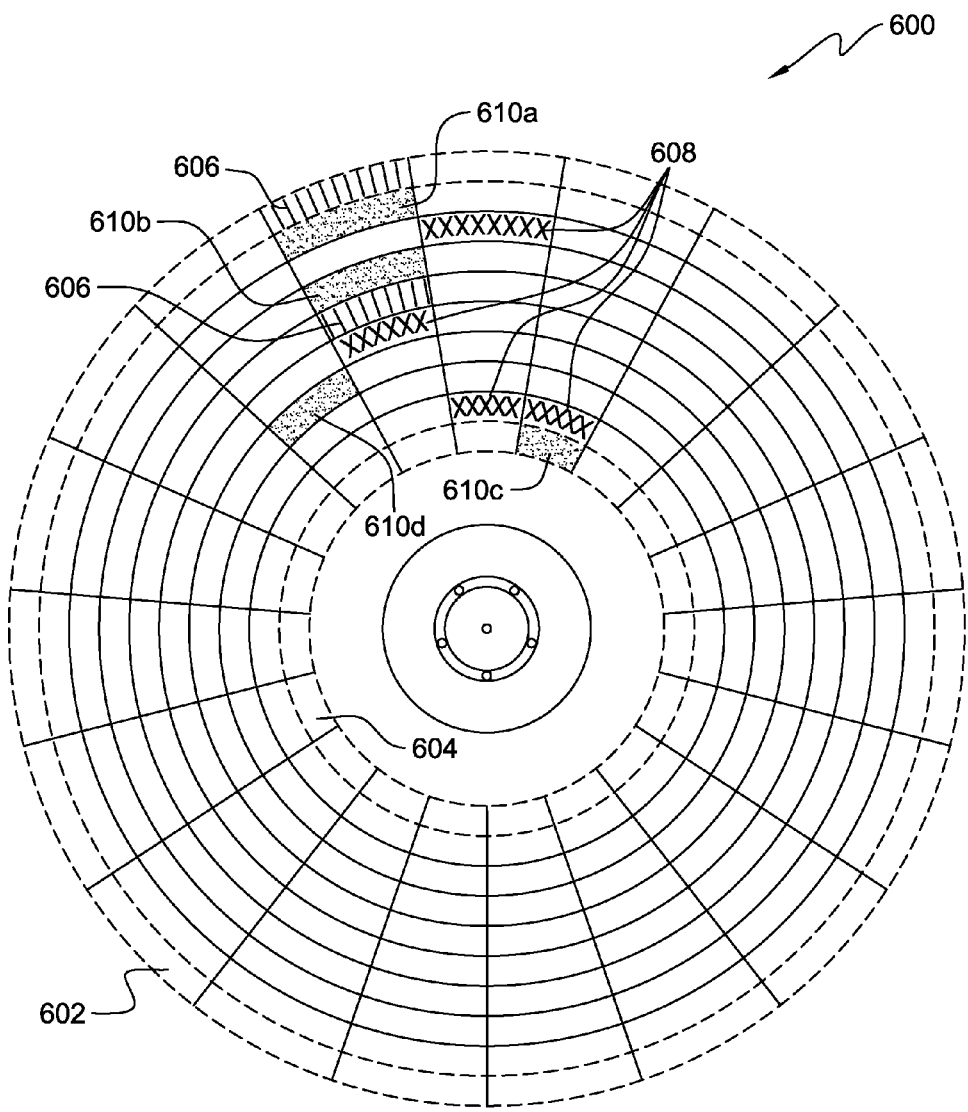
FIG. 6 is a diagram of a platter illustrating a hypothetical allocation scenario in which a free block is selected from a source group in accordance with the operational steps of FIG. 5.

FIG. 6 is a diagram of the surface of a platter illustrating a hypothetical allocation scenario in which a block is selected from the free list of a source group in accordance with the operational steps of FIG. 5. Platter 600 can be, for example, one of several platters within hard disk drive 112. Platter 600 includes ten tracks, where track 602 represents track 1 (i.e., the outermost track) and track 604 represents track 10 (i.e., the innermost track). Blocks 606 represent recently allocated blocks. Blocks 608 represent allocated blocks of the destination group that reside on less utilized tracks (tracks 3, 6, and 9 in this example) and have a write count similar to the end block write count. Blocks 610a through 610d represent blocks from the free list of the source group. It should be appreciated that platter 600 is a simplified illustration. For example, platter 600, as depicted, possesses a small number of tracks and blocks; each platter in hard disk drive 112 can contain many more tracks and blocks than depicted, and each depicted block consists of a finite number of data sectors.

Blocks 610a and 610b are each located on a track that is adjacent to a track on which one block 606 is located and a track on which one block 608 is located (i.e., blocks 610a and 610b each exist on one of the lists created in step 506 and one of the lists created in step 510). Block 610c is located on a track that is adjacent to a track on which two blocks 608 are located (i.e., block 610c exists on two of the lists created in step 506). Block 610d, however, is located on a track that is adjacent to a track on which only one block 608 is located (i.e., block 610*d* exists on one of the lists created in step 506). Thus, per step 512, blocks 610*a* through 610*c* are preferred over block 610*d* (i.e., blocks 610*a* through 610*c* each exist on a total of 2 lists, whereas block 610*d* only exists on 1 list). Out of blocks 610*a* through 610*c*, blocks 610*a* and 610*b* are closest to a recently allocated block 608 and are therefore preferred over block 610*c* per step 514. Per step 516, out of blocks 610*a* and 610*b*, block 610*a* has the lower block number (i.e., block 610*a* resides on track 2, whereas block 610*b* resides on track 4). Accordingly, in this exemplary embodiment and hypothetical allocation scenario, block 610*a* is selected by block allocator 116 to fulfill the allocation request.

Figure 7:
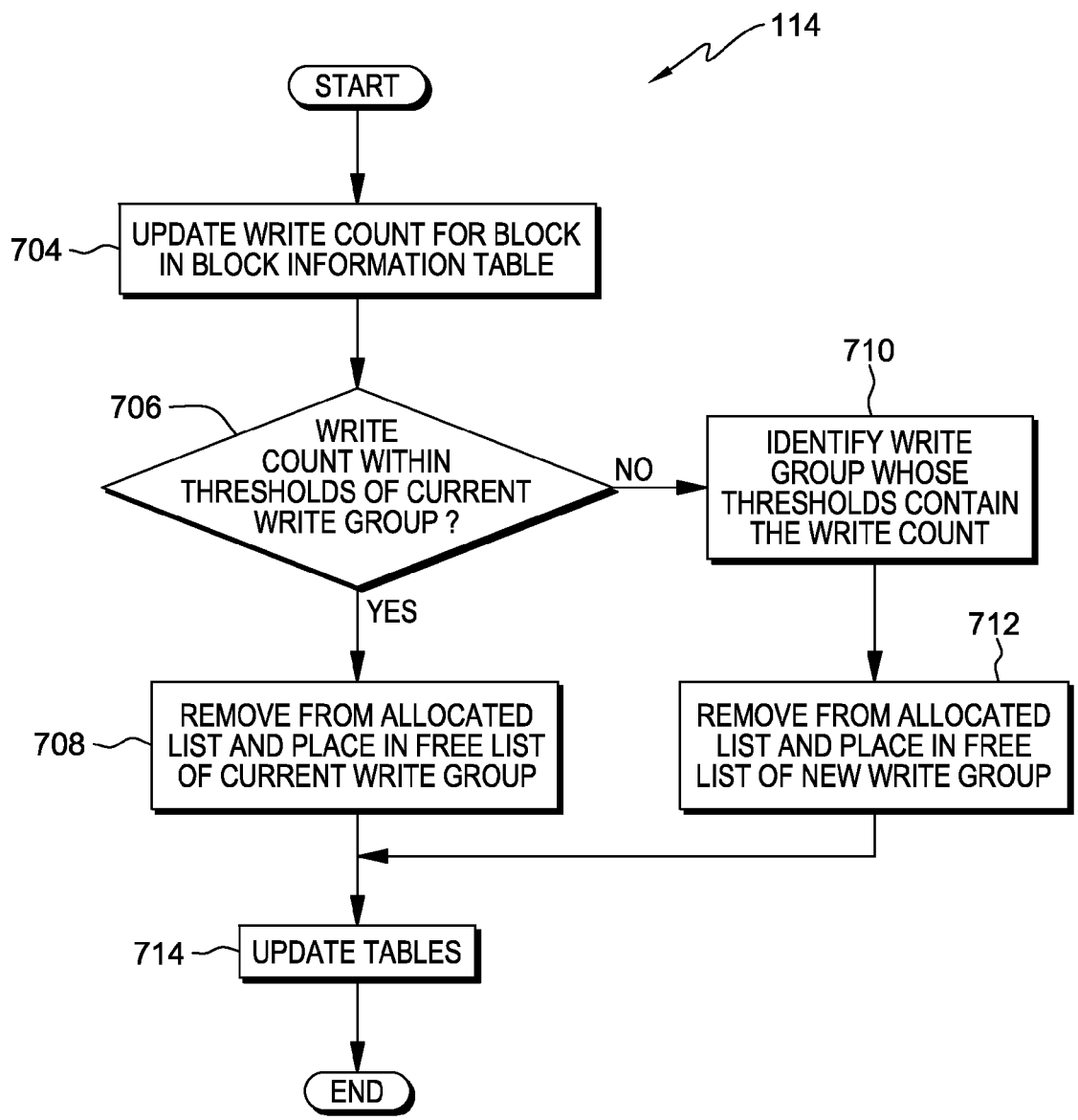
FIG. 7 is a flowchart illustrating operational steps for updating the write count and write group of a block after a block delete operation in accordance with an embodiment of the present invention.
Figure 8:
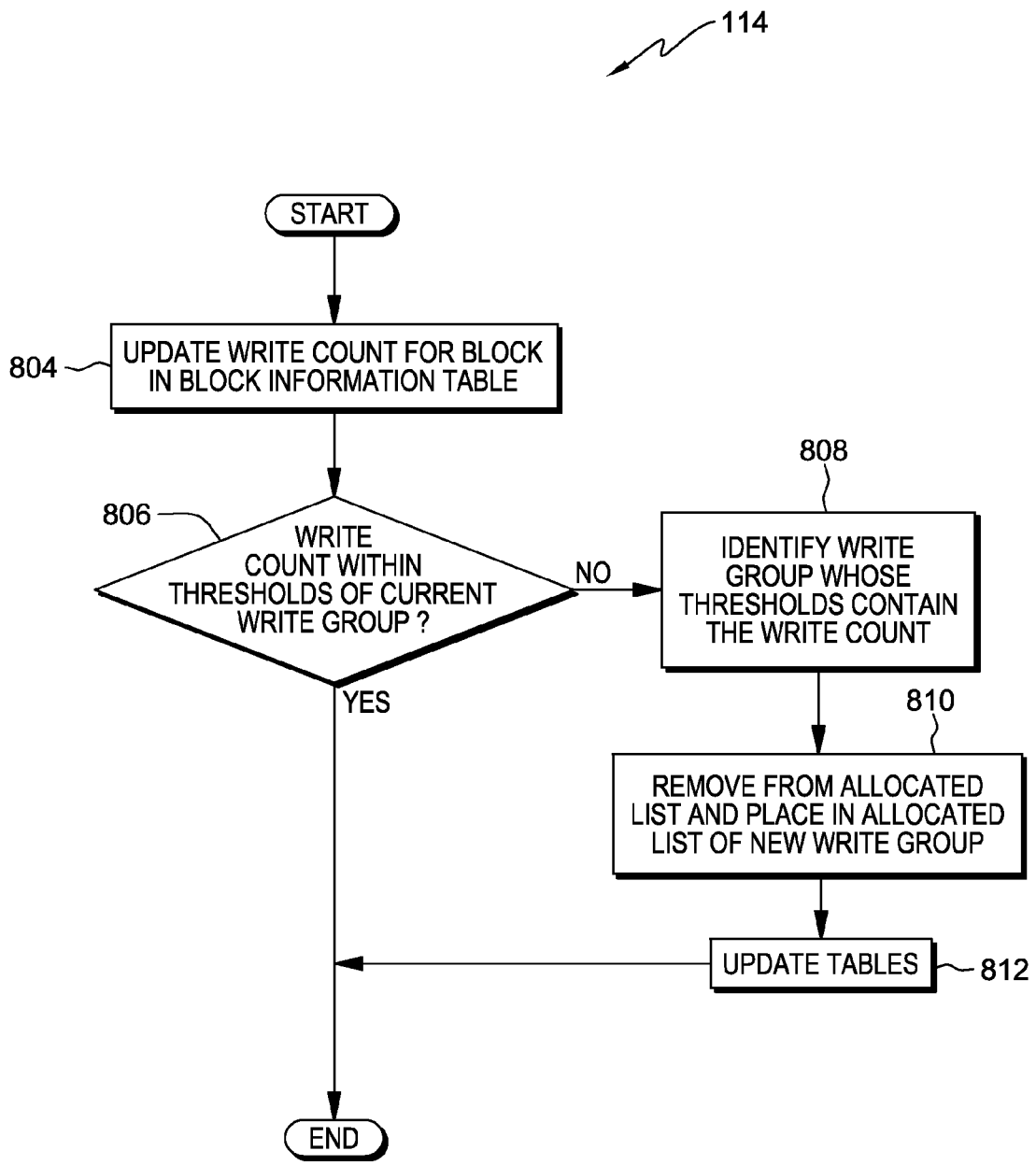
FIG. 8 is a flowchart illustrating operational steps for updating the write count and write group of a block after a cache flush operation in accordance with an embodiment of the present invention.

FIGS. 7 and 8 are flowcharts illustrating operational steps for updating write counts and write groups after a block delete operation and a block flush operation, respectively, in accordance with embodiments of the present invention. File system 114 (i.e., one or more modules in file system 114) updates write counts and write groups during these file system processes to ensure block allocator 116 utilizes accurate information when allocating blocks to fulfill allocation requests.

FIG. 7 illustrates operational steps for updating the write count and write group of a deleted block after a block delete operation in accordance with an embodiment of the present invention. In step 704, file system 114 updates the deleted block's write count in block information table 120. In step 706, file system 114 determines whether the deleted block's write count is within the write count thresholds of the write group in which it currently resides. In a preferred embodiment, file system 114 accesses block information table 120 to identify the deleted block's write count and current write group. File system 114 then accesses write group table 118 to determine whether the minimum write threshold of the deleted block's current write group is less than or equal to the deleted block's write count and whether the maximum write threshold is greater than the deleted block's write count.

If file system 114 determines that the deleted block's write count is within the write count thresholds of the write group in which the deleted block currently resides, then, in step 708, file system 114 removes the deleted block from the allocated block list of the current write group and adds it to the free block list of the same write group.

If, in step 706, file system 114 determines that the deleted block's write count is not within the write count thresholds of the write group in which the deleted block currently resides, then, in step 710, file system 114 accesses write group table 118 to identify the write group whose minimum write threshold is less than or equal to the deleted block's write count and whose maximum write threshold is greater than the deleted block's write count.

In step 712, file system 114 removes the deleted block from the allocated list of the current write group and adds it to the free block list of the write group identified in step 710.

In step 714, file system 114 updates write group table 118, block information table 120, and track usage table 122 to reflect the deleted block's change of allocation status (i.e., from allocated to free) and any movement among write groups.

FIG. 8 illustrates operational steps for updating the write count and write group of a block after a cache flush operation in accordance with an embodiment of the present invention. In a preferred embodiment, hard disk drive 112 has an integrated cache. The integrated cache stores data to be written to (and data that has been read from) the platters of hard disk drive 112. For example, when an application writes data to a block on hard disk drive 112, the data is first written to the integrated cache. A cache flush operation, as used in this specification, refers to the file system process of flushing a block from the integrated cache and writing that data to the appropriate allocated block on a platter ("flushed block"). Each such cache flush operation constitutes a write to the flushed block. In embodiments utilizing write-through caching (i.e., data is immediately written to the appropriate allocated block on a platter and is not first stored in the integrated cache), the operational steps of FIG. 8 are the same, but the steps occur upon each application write, as opposed to occurring upon each cache flush operation.

In step 804, file system 114 updates the flushed block's write count in block information table 120 (i.e., increments the flushed block's write count). In step 806, file system 114 determines whether the flushed block's write count is within the write count thresholds of the write group in which it currently resides. In a preferred embodiment, file system 114 accesses block information table 120 to identify the flushed block's write count and current write group. File system 114 then accesses write group table 118 to determine whether the minimum write threshold of the flushed block's current write group is less than or equal to the flushed block's write count and whether the maximum write threshold is greater than the flushed block's write count.

If file system 114 determines that the flushed block's write count is not within the write count thresholds of the write group in which the flushed block currently resides, then, in step 808, file system 114 accesses write group table 118 to identify the write group whose minimum write threshold is less than or equal to the flushed block's write count and whose maximum write threshold is greater than the flushed block's write count.

In step 810, file system 114 removes the flushed block from the allocated list of the current write group and adds it to the allocated block list of the write group identified in step 808.

In step 812, file system 114 updates write group table 118 and block information table 120 to reflect the flushed block's movement among write groups.

If, in step 806, file system 114 determines that the flushed block's write count is within the write count thresholds of the write group in which the flushed block currently resides, then file system 114 does not move the flushed block to a new write group.

The operational steps discussed with regard to FIGS. 3 through 8 are illustrative of one or more embodiments of the present invention. It should be understood that the content of each step, as well as the order of operation, can be modified without departing from the spirit and intended scope of the present invention.

Aspects of the present invention have been described with respect to block diagrams and/or flowchart illustrations of methods, apparatus (system), and computer program products according to embodiments of the invention. It will be understood that each block of the flowchart illustrations and/or block diagrams, and combinations of blocks in the flowchart illustrations and/or block diagrams, can be implemented by computer instructions. These computer instructions may be provided to a processor of a computer system such as a general purpose computer, special purpose computer, or other programmable data processing apparatus to produce a machine, such that instructions, which execute via the processor of the computer system or other programmable data processing apparatus, create means for implementing the functions/acts specified in the flowchart and/or block diagram blocks.

The aforementioned programs can be written in any combination of one or more programming languages, including, for example, low-level, high-level, object-oriented or non object-oriented languages, such as Java, Smalltalk, C, and C++. The program code may execute entirely on a user's computer system, partly on a user's computer system, as a stand-alone software package, partly on a user's computer system and partly on a remote computer system, or entirely on a remote computer system or server. In the latter scenario, the remote computer system may be connected to the user's computer through any type of network, including a local area network (LAN) or a wide area network (WAN), or the connection may be made to an external computer (for example, through the Internet using an Internet service provider). Alternatively, the functions of the aforementioned programs can be implemented in whole or in part by computer circuits and other hardware.

The foregoing description of various embodiments of the present invention has been presented for purposes of illustration and description. It is not intended to be exhaustive nor limit the invention to the precise form disclosed. Many modifications and variations of the present invention are possible. Such modifications and variations that may be apparent to a person skilled in the art of the invention are intended to be included within the scope of the invention as defined by the accompanying claims.

What is claimed is:

1. A method for allocating a block of storage space on a write surface of a hard disk drive, the method comprising the steps of:
    a computer system maintaining a write count for each block on the hard disk drive, wherein a write count is a cumulative number of write operations performed on a block of storage space;
    the computer system receiving an allocation request for a block of storage space on the hard disk drive;
    the computer system identifying one or more candidate blocks of storage space on the hard disk drive that can be selected to fulfill the allocation request;
    the computer system determining an estimated write count, wherein the estimated write count is an estimated number of write operations that will be performed on any candidate block that is subsequently selected from the one or more candidate blocks to fulfill the allocation request;
    the computer system identifying one or more allocated blocks of storage space on the hard disk drive whose write counts are within a specified number of write operations of the estimated write count;
    the computer system selecting a candidate block from the one or more candidate blocks based, at least in part, on physical proximity of the candidate block to one or more of the one or more allocated blocks of storage space on the hard disk drive whose write counts are within a specified number of write operations of the estimated write count, such that the selected candidate block is at least on a track adjacent to a track of at least one of the one or more allocated blocks of storage space on the hard disk drive whose write counts are within a specified number of write operations of the estimated write count; and
    the computer system allocating the selected candidate block to fulfill the allocation request.

2. The method of claim 1, wherein the one or more candidate blocks of storage space on the hard disk drive are members of a group that is associated with a number of write operations, and wherein the estimated write count is an estimated number of write operations equal to an estimated number of write operations that will be performed on any candidate block that will be subsequently selected from the group to fulfill the allocation request plus the number of write operations associated with the group.

3. The method of claim 1, wherein the estimated number of write operations that will be performed on any candidate block that is subsequently selected from the one or more candidate blocks to fulfill the allocation request is determined based upon at least one of: a file extension associated with the allocation request, an input and output pattern of an application associated with the allocation request, or the average number of write operations performed on all allocated blocks of storage space on the hard disk drive.

4. The method of claim 1, further comprising the step of the computer system identifying one or more allocated blocks that were allocated to fulfill one or more prior allocation requests, and wherein the step of the computer system selecting the candidate block comprises the computer system selecting a candidate block from the one or more candidate blocks based, at least in part, on physical proximity of the candidate block to one or more of the one or more allocated blocks of storage space on the hard disk drive whose write counts are within a specified number of write operations of the estimated write count and on physical proximity of the candidate block to one or more of the one or more allocated blocks that were allocated to fulfill one or more of the prior allocation requests.

5. The method of claim 1, wherein the one or more candidate blocks of storage space on the hard disk drive are members of a group that is associated with a number of write operations, and wherein the estimated write count is an estimated number of write operations equal to an estimated number of write operations that will be performed on any candidate block that will be subsequently selected from the group to fulfill the allocation request plus the number of write operations associated with the group.

6. The method of claim 1, wherein the estimated number of write operations that will be performed on any candidate block that is subsequently selected from the one or more candidate blocks to fulfill the allocation request is determined based upon at least one of: a file extension associated with the allocation request, an input and output pattern of an application associated with the allocation request, or the average number of write operations performed on all allocated blocks of storage space on the hard disk drive.

7. The method of claim 1, further comprising the step of the computer system identifying one or more allocated blocks that were allocated to fulfill one or more prior allocation requests, and wherein the step of the computer system selecting the candidate block comprises the computer system selecting a candidate block from the one or more candidate blocks that is located on a track that is adjacent to one or more tracks on which the one or more allocated blocks of storage space on the hard disk drive whose write counts are within a specified number of write operations of the estimated write count are located and to one or more tracks on which the one or more allocated blocks that were allocated to fulfill one or more prior allocation requests are located.

8. A computer system for allocating a block of physical storage space on a write surface of a hard disk drive, the system comprising:
    one or more processors, one or more computer-readable memories, one or more computer-readable tangible storage devices, and program instructions stored on at least one of the one or more storage devices for execution by at least one of the one or more processors via at least one of the one or more memories, the program instructions comprising:

program instructions to maintain a write count for each block on the hard disk drive, wherein a write count is a cumulative number of write operations performed on a block of storage space;

program instructions to receive an allocation request for a block of storage space on the hard disk drive;

program instructions to identify one or more candidate blocks of storage space on the hard disk drive that can be selected to fulfill the allocation request;

program instructions to determine an estimated write count, wherein the estimated write count is an estimated number of write operations that will be performed on any candidate block that is subsequently selected from the one or more candidate blocks to fulfill the allocation request;

program instructions to identify one or more allocated blocks of storage space on the hard disk drive whose write counts are within a specified number of write operations of the estimated write count;

program instructions to select a candidate block from the one or more candidate blocks based, at least in part, on physical proximity of the candidate block to one or more of the one or more allocated blocks of storage space on the hard disk drive whose write counts are within a specified number of write operations of the estimated write count, such that the selected candidate block is at least on a track adjacent to a track of at least one of the one or more allocated blocks of storage space on the hard disk drive whose write counts are within a specified number of write operations of the estimated write count; and program instructions to allocate the selected candidate block to fulfill the allocation request.

9. The system of claim 8, wherein the one or more candidate blocks of storage space on the hard disk drive are members of a group that is associated with a number of write operations, and wherein the estimated write count is an estimated number of write operations equal to an estimated number of write operations that will be performed on any candidate block that will be subsequently selected from the group to fulfill the allocation request plus the number of write operations associated with the group.

10. The system of claim 8, wherein the estimated number of write operations that will be performed on any candidate block that is subsequently selected from the one or more candidate blocks to fulfill the allocation request is determined based upon at least one of: a file extension associated with the allocation request, an input and output pattern of an application associated with the allocation request, or the average number of write operations performed on all allocated blocks of storage space on the hard disk drive.

11. The system of claim 8, wherein the program instructions stored on at least one of the one or more storage devices further comprise program instructions to identify one or more allocated blocks that were allocated to fulfill one or more prior allocation requests, and wherein the program instructions to select the candidate block comprise program instructions to select a candidate block from the one or more candidate blocks based, at least in part, on physical proximity of the candidate block to one or more of the one or more allocated blocks of storage space on the hard disk drive whose write counts are within a specified number of write operations of the estimated write count and on physical proximity of the candidate block to one or more of the one or more allocated blocks that were allocated to fulfill one or more of the prior allocation requests.

12. The system of claim 8, wherein the one or more candidate blocks of storage space on the hard disk drive are members of a group that is associated with a number of write operations, and wherein the estimated write count is an estimated number of write operations equal to an estimated number of write operations that will be performed on any candidate block that will be subsequently selected from the group to fulfill the allocation request plus the number of write operations associated with the group.

13. The system of claim 8, wherein the estimated number of write operations that will be performed on any candidate block that is subsequently selected from the one or more candidate blocks to fulfill the allocation request is determined based upon at least one of: a file extension associated with the allocation request, an input and output pattern of an application associated with the allocation request, or the average number of write operations performed on all allocated blocks of storage space on the hard disk drive.

14. The system of claim 8, wherein the program instructions stored on at least one of the one or more storage devices further comprise program instructions to identify one or more allocated blocks that were allocated to fulfill one or more prior allocation requests, and wherein the program instructions to select the candidate block comprise program instructions to select a candidate block from the one or more candidate blocks that is located on a track that is adjacent to one or more tracks on which the one or more allocated blocks of storage space on the hard disk drive whose write counts are within a specified number of write operations of the estimated write count are located and to one or more tracks on which the one or more allocated blocks that were allocated to fulfill one or more prior allocation requests are located.

15. A computer program product for allocating a block of physical storage space on a write surface of a hard disk drive, the computer program product comprising:

one or more computer-readable tangible storage devices and program instructions, executable by a computer processor and stored on at least one of the one or more storage devices, the program instructions comprising:

program instructions to maintain a write count for each block on the hard disk drive, wherein a write count is a cumulative number of write operations performed on a block of storage space;

program instructions to receive an allocation request for a block of storage space on the hard disk drive;

program instructions to identify one or more candidate blocks of storage space on the hard disk drive that can be selected to fulfill the allocation request;

program instructions to determine an estimated write count, wherein the estimated write count is an estimated number of write operations that will be performed on any candidate block that is subsequently selected from the one or more candidate blocks to fulfill the allocation request;

program instructions to identify one or more allocated blocks of storage space on the hard disk drive whose write counts are within a specified number of write operations of the estimated write count;

program instructions to select a candidate block from the one or more candidate blocks based, at least in part, on physical proximity of the candidate block to one or more of the one or more allocated blocks of storage space on the hard disk drive whose write counts are within a specified number of write operations of the estimated write count, such that the selected candidate block is at least on a track adjacent to a track of at least one of the one or more allocated blocks of storage space on the hard disk drive whose write counts are within a specified number of write operations of the estimated write count; and program instructions to allocate the selected candidate block to fulfill the allocation request.

16. The computer program product of claim 15, wherein the one or more candidate blocks of storage space on the hard disk drive are members of a group that is associated with a number of write operations, and wherein the estimated write count is an estimated number of write operations equal to an estimated number of write operations that will be performed on any candidate block that will be subsequently selected from the group to fulfill the allocation request plus the number of write operations associated with the group.

17. The computer program product of claim 15, wherein the estimated number of write operations that will be performed on any candidate block that is subsequently selected from the one or more candidate blocks to fulfill the allocation request is determined based upon at least one of: a file extension associated with the allocation request, an input and output pattern of an application associated with the allocation request, or the average number of write operations performed on all allocated blocks of storage space on the hard disk drive.

18. The computer program product of claim 15, wherein the program instructions executable by a computer processor and stored on at least one of the one or more storage devices further comprise program instructions to identify one or more allocated blocks that were allocated to fulfill one or more prior allocation requests, and wherein the program instructions to select the candidate block comprise program instructions to select a candidate block from the one or more candidate blocks based, at least in part, on physical proximity of the candidate block to one or more of the one or more allocated blocks of storage space on the hard disk drive whose write counts are within a specified number of write operations of the estimated write count and on physical proximity of the candidate block to one or more of the one or more allocated blocks that were allocated to fulfill one or more of the prior allocation requests.

19. The computer program product of claim 15, wherein the one or more candidate blocks of storage space on the hard disk drive are members of a group that is associated with a number of write operations, and wherein the estimated write count is an estimated number of write operations equal to an estimated number of write operations that will be performed on any candidate block that will be subsequently selected from the group to fulfill the allocation request plus the number of write operations associated with the group.

20. The computer program product of claim 15, wherein the estimated number of write operations that will be performed on any candidate block that is subsequently selected from the one or more candidate blocks to fulfill the allocation request is determined based upon at least one of: a file extension associated with the allocation request, an input and output pattern of an application associated with the allocation request, or the average number of write operations performed on all allocated blocks of storage space on the hard disk drive.

21. The computer program product of claim 15, wherein the program instructions stored on at least one of the one or more storage devices further comprise program instructions to identify one or more allocated blocks that were allocated to fulfill one or more prior allocation requests, and wherein the program instructions to select the candidate block comprise program instructions to select a candidate block from the one or more candidate blocks that is located on a track that is adjacent to one or more tracks on which the one or more allocated blocks of storage space on the hard disk drive whose write counts are within a specified number of write operations of the estimated write count are located and to one or more tracks on which the one or more allocated blocks that were allocated to fulfill one or more prior allocation requests are located.

* * * * *